April 21, 1970  W. C. REED ET AL  3,508,145
MEASUREMENT OF MOISTURE IN SHEET MATERIALS
BY USE OF A SLOTTED WAVEGUIDE
Filed Aug. 29, 1966
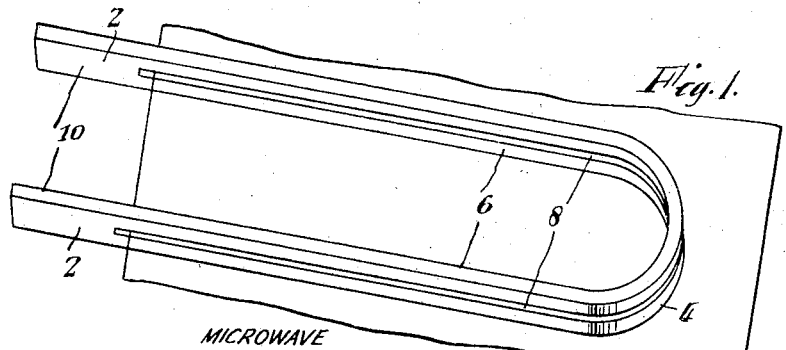
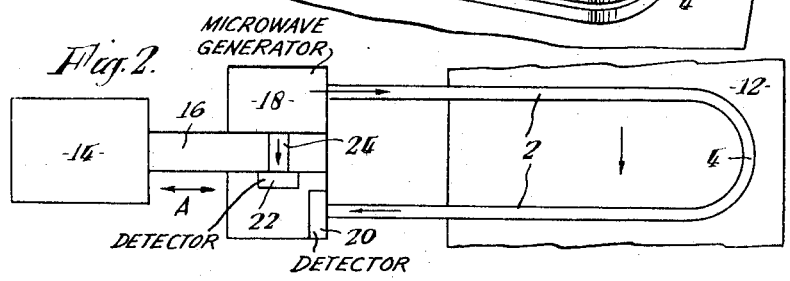
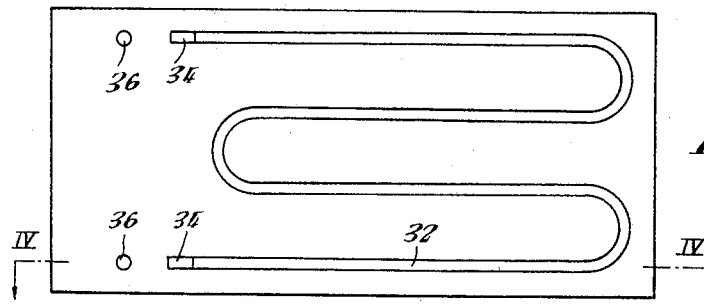
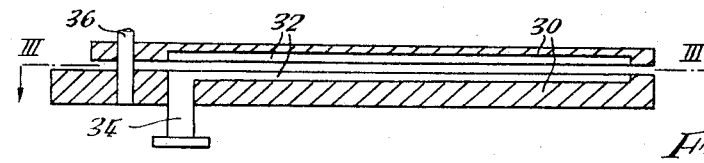
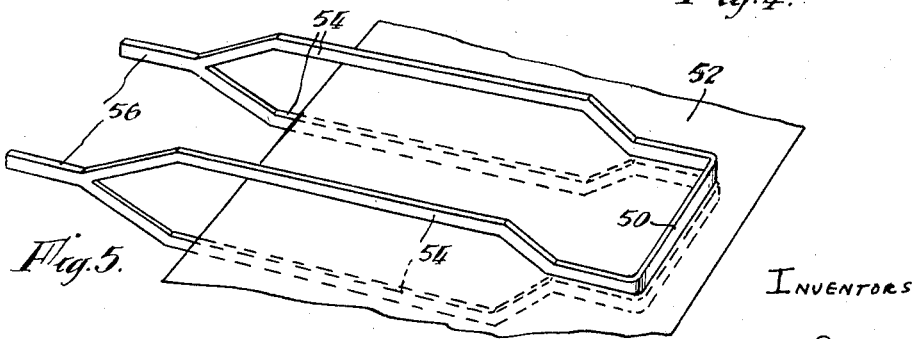
INVENTORS
WILLIAM CHARLES REED
JACK BILBROUGH
By Jacobs & Jacobs
Attys.

United States Patent Office 3,508,145
Patented Apr. 21, 1970

3,508,145
MEASUREMENT OF MOISTURE IN SHEET MATERIALS BY USE OF A SLOTTED WAVEGUIDE
William Charles Reed, Whitley Bay, Northumberland, and Jack Bilbrough, Newcastle-upon-Tyne, England, assignors, by mesne assignments, to The Rank Organisation Limited, London, England, a company of Great Britain.
Filed Aug. 29, 1966, Ser. No. 575,871
Claims priority, application Great Britain, Sept. 2, 1965, 37,512/65
Int. Cl. G01r 27/04
U.S. Cl. 324—58.5    11 Claims

ABSTRACT OF THE DISCLOSURE

The specification describes apparatus for the measurement of the moisture content of sheet material using microwave energy in a waveguide that has slots in opposed walls that define a planar path for the sheet material so that the material can be introduced in to the waveguide through the slots. The slotted portion of the waveguide occupies a curved path such that the length within the extent of the slots lies to one side of a straight line joining the ends of the slots to make it possible to introduce the sheet into the waveguide by relative movement in the plane of the sheet. In a further development, waveguide branch portions that are themselves unslotted diverge from the ends of the slots to join again at a station transversely spaced from the slots so that the slotted region can be brought into coincidence with a part of a sheet remote from the edges of the sheet to measure the moisture content in that part alone.

---

This invention relates to the measurement of moisture in sheet or web materials. It is a well-known fact that moisture will attenuate microwaves propagated through waveguides if such moisture is present within the guide. Proposals have already been made for measuring the amount of moisture in sheet material by passing the material through slots formed in opposing walls of a hollow waveguide, the plane of the slots being parallel to the E-plane of the microwaves passing through the waveguide. By comparison of the strength of the electromagnetic field at points in the waveguide before and after the slot the attenuation resulting from a sheet of material passing through the waveguide by way of the slots can be measured, and the degree of moisture in the material can thus be calculated.

In previous constructions for measuring moisture in this way the slot is defined between two opposite channel-shaped portions of a rectangular waveguide, one such portion being movable away from the other portion to open the waveguide so that a sheet or web may be introduced thereto. The removable portion of the waveguide can then be replaced so that the sheet lies in the slot formed between the two opposing portions. The removable portion may be hinged at one end to a fixed part of the waveguide, or may be freely and completely removable from the remained of the waveguide. Apparatus as described has the disadvantage that some time is taken in opening the waveguide, placing the sheet or web in position and closing the waveguide before measurements can be made. Furthermore it is difficult to position a moving sheet through the slots so that if a continuous sheet manufacturing or treating process is being performed it may be necessary to interrupt this when measurements need to be taken.

A further difficulty with such apparatus is the necessity of ensuring good electrical contact between the removable portion of the waveguide and the parts of the waveguide at each longitudinal end of the removable portion or alternatively of having to use electrical matching means, such as quarter-wave choke transformer sections, at each end of the removable portion to ensure uniform propagation of microwaves along the waveguide when the removable portion is in position. This obviously increases cost and production difficulties.

According to the present invention there is provided a hollow waveguide for use in the measurement of the moisture content of a sheet or web of material, a portion of said waveguide being formed with slots in opposed walls and the transmission path defined by the waveguide being curved to such a shape that its length within the region of said slots lies to one side of a straight line joining the ends of the slots, the plane containing the curve being transverse to the planes of the slotted walls whereby movement of the waveguide in the plane of the curve can bring one edge of the sheet or web into the slots.

Such a waveguide can be moved so that the sheet or web enters or leaves the slot at any stage of a manufacturing process without interfering with that process, and without having to open, close, remove or replace any part of the waveguide structure. As there is no break in the waveguide caused by a removable part no electrical matching problems arise.

The shape of the waveguide may be that of a deep U or hairpin, the slot extending from near the free end of one arm of the U and round its bend to near the free end of the other arm of the U.

The waveguide can then be moved in the direction in which the arms of the U extend, so that it may be brought to a sheet or web from one edge thereof, the edge of the sheet or web entering the slot at the curve of the U. It will be appreciated that other shapes for the waveguide are possible, and in particular that the waveguide can be curved in serpentine or convoluted form so that a relatively long signal path is able to be contained in a relatively small area of the sheet or web.

The slots in the opposed walls of the waveguide are preferably formed along the centre lines of these walls, so that they will be coincident with the direction of maximum electrical field within the waveguide when microwaves are propagated therealong. This positioning in the region of maximum field gives a high sensitivity.

To use a waveguide according to the invention to measure the moisture content of a sheet or web, one end of the waveguide is coupled to a source of microwave energy, and the other end of the waveguide may be coupled to a detector, or may be constructed so as to reflect the impinging microwave energy back along the waveguide to a detector. The coupling to the source of microwave power must be such that the E-plane of the waves passing along the waveguide is parallel to the plane across the waveguide in which the slots lie. The slots are then in positions such that they will not interfere with electrical currents flowing in the waveguide walls, thus enabling normal waveguide propagation of electromagnetic energy to take place.

Various embodiments of the invention will now be more particularly described by way of example with reference to FIGS. 1 to 5 of the accompanying drawings, wherein:

FIG. 1 shows a waveguide according to the invention embracing a sheet or web of material, FIG. 2 shows the waveguide of FIG. 1 connected to a microwave circuit, FIGS. 3 and 4 are mutually perpendicular sectional views on the lines III—III and IV—IV of an alternative form of waveguide according to the invention, and FIG. 5 is a perspective view of a further form of waveguide according to the invention.

Referring to FIG. 1 of the drawings, the waveguide is of rectangular section and has a U-form shape comprising straight limbs 2 and an intermediate curved length 4. Opposed walls 6 of the waveguide, which are perpendicular to the plane containing the curved length 4, each have a slot 8 along their length. Each slot is continuous between free ends 10 of the limbs 2 and they coincide with the centrelines of their walls 6. The drawing shows a sheet or web 12 of transparent material inserted in the slots 8 so that it is in the median plane of the waveguide. It will be readily appreciated that relative movement between the waveguide and the sheet in the plane of the curved length 4 is able to move the waveguide to and from this embracing position.

FIG. 2 illustrates schematically an apparatus employed with this waveguide to measure the moisture content of the sheet. A support or carriage 14 contains control equipment of the apparatus and mounts a cantilever arm 16 that is telescopically adjustable as indicated by the arrows A. The arm carries components of the microwave circuit including the waveguide itself. In the illustrated example, the circuit comprises a microwave generator 18 coupled to one end of the waveguide, and a detector 20 such as a crystal detector coupled to the other. Part of the generated microwave energy is also passed directly to a second detector 22 by way of a waveguide branch 24 to provide a comparison signal. Controllable attenuation means may also be provided in one of the signal paths. A comparison of the signals from the two detectors can then be arranged to give a measurement of the attenuation due to moisture in the sheet and this output can be used as a process control input.

In a modified circuit arrangement that is not shown, the microwaves leaving the generator and those leaving the waveguide after passing therealong can be directed along the main arms of the T, so giving a signal proportional to the power difference in the side arm of the T, which signal can be detected by any suitable detector positioned in this side arm and used to give a measurement of attenuation.

In an alternative unillustrated circuit arrangement using a reflection technique, one end of the waveguide is closed so that it reflects the microwave energy and causes standing waves to be set up within the waveguide. The other end of the waveguide, together with one end of a reference waveguide, form a magic tee also having an H-arm to which a source of microwave power is coupled, and an E-arm in which is placed a crystal or other suitable detector. The reference waveguide contains a variable attenuator and is terminated by an adjustable short circuit or a fixed short circuit and phaseshifter. In use, the microwave power injected into the magic tee divides between the slotted waveguide and the reference waveguide. In each of these waveguides standing waves are set up because of the reflection from the terminated end, and the reflected waves reaching the magic tee give rise to a difference signal in the E-arm if the attenuation and phase shift occurring in the two waveguides is different. This difference signal is received by the detector and can be used to give a measurement of attenuation and thus of moisture content. In alternative forms of this basic arrangement the magic tee may be replaced by other forms of hybrid junction such as a hybrid ring or a ferrite circulator.

In all circuit arrangements described measurement of the moisture content can either be taken from the signal arriving at a detector, or a null method can be used whereby a signal in a reference waveguide is attenuated to a point where no signal appears at the detector, and the setting of this reference attenuation is used to give the required measurement. Since the present invention is concerned essentially with a novel form of waveguide rather than the manner of processing the signals developed in such a waveguide, further details of the circuits that may be used are unnecessary here. It may be mentioned, however, that illustrated examples of circuits equivalent to these described above may be found in our co-pending applications Ser. Nos. 494,154, now abandoned, and 559,155.

In FIGS. 3 and 4 the slotted waveguide is formed in a pair of opposed metal plates 30 which are arranged with a pair of their broader faces adjacent and parallel, these faces having coincident channels 32 of equal depth machined in them to define the waveguide and the gap between the channels forms the slots in the waveguide walls. A particular feature of this arrangement is the ease with which serpentine or convoluted waveguide forms such as the illustrated example can be produced to provide an extended signal path in a compact area. The signal path is continued from the channelled regions through closed-section waveguides such as 34 which project from one or both of the mutually remote faces of the plates for connection to a microwave circuit such as those described above.

The spacing of the plates 30 is adjustable, the upper plate being slidable on guide pins 36; a hinged connection could be used alternatively. While no adjustment mechanism is illustrated this could be mechanically operated, and possibly spring-loaded, its function being to ensure that a web or sheet being monitored is in contact with the plates so that it lies on the centre line of the waveguide and cannot move transversely to the plane of the gap between the channels 32 to impair accuracy of measurement.

The modified arrangement of FIG. 5 has slotted region 50 of the waveguide disposed in a relatively narrow area extending along the length of a web 52. Each slotted half of the waveguide has its ends continued into full-size closed-section waveguides 54 and the pairs of waveguides 54 associated with each end of the slotted region are spaced from each other until they join respective single closed-section waveguides 56. In the illustrated example, the line joining the junctions of the waveguides 56 with their pairs of waveguides 54 is spaced parallel to and some distance from the line joining the ends of the slots and the waveguides 54 are arched away from each other so that the web insertion gap defined by the slotted region is continued laterally to the junctions of the waveguides 56.

This arrangement is particularly suitable where it is desired to obtain an indication of moisture content at some distance from an edge of a sheet or web and also allows such measurement to be carried out at any arbitrarily chosen portion of the width—thus the figure shows a relatively narrow width band of the web 52 being monitored. As illustrated, the waveguide is intended for measurement in transmission but if a reflection arrangement is required, one of the waveguides 56 and its associated pair of waveguides 54 can be dispensed with.

The complete assembly of the waveguide, microwave generator and detector may be assembled as a portable instrument which can be used by hand at any stage of a sheet or web manufacturing process. Alternatively this assembly may be located at a fixed point in the process, and may be mounted on an extensible arm supported by a carriage carrying equipment for controlling movement of the arm so that it may extend to move the waveguide towards and on to the sheet so that the sheet passes through the slots, or to retract so that the waveguide is moved from the sheet. When a fixed arrangement of this kind is used the sheet is preferably guided past the region of the waveguide so that it is always maintained at a level where it will enter the slots without fouling the solid part of the waveguide.

What we claim and desire to secure by Letters Patent is:

1. A hollow waveguide for use in the measurement of the moisture content of a sheet or web of material, a portion of said waveguide having opposed walls and slots in said opposed walls for the location of said sheet or web within an energy transmission path defined by the waveguide, said path being curved to a shape such that its length within the extent of the slots lies to one side of a straight line joining the ends of the slots, a plane containing said path curvature being transverse to the planes of the slotted walls whereby movement of the waveguide in said curvature plane can bring one edge of the sheet or web into the slot the construction and arrangement being such that said path spans the whole width or a portion of the width of the sheet or web with at least a part of said width projection through the slots beyond the inside boundary of said curved path, and relative displacement between the waveguide and the sheet or web in a direction parallel to said edge permits said measurement to be made continuously along the length of the sheet or web over said whole width or a portion of the width thereof.

2. A waveguide according to claim 1 wherein the slots are formed at the centrelines of their associated walls wereby an inserted sheet or web is located in the median plane of the waveguide.

3. A waveguide according to claim 1 wherein the curved path is U-shaped, serpentine or of convoluted configuration.

4. A waveguide according to claim 3 wherein a pair of plates, each having opposed broad faces extending over the area enclosed by the slotted waveguide and said straight line, are arranged with respective broad faces adjacent and parallel, co-extending elongate recesses in said adjacent faces defining said waveguide such that the spacing between said faces forms the slots.

5. A waveguide according to claim 4 having waveguide portions projecting transversely from at least one of the mutually remote broad faces of the plates and communicating with the slotted region of the waveguide to form a continuation of the transmission path therefrom.

6. A waveguide according to claim 1 further characterised in that means are provided for adjustment of the width of the slots.

7. A waveguide according to claim 1 wherein, at least at one end of the slots, two closed-section waveguide portions extend from the slotted waveguide portion to define a branched continuation of the energy path in the slotted portion, said closed-section portions projecting away from the plane of the slots in the region of the slotted portion and having ends remote from the slotted portion that converge to a junction of the two closed-section portions, that is, located at a station transversely spaced from the ends of the slots whereby said slotted portion can coincide with a region of a web or sheet spaced from the edges thereof.

8. A waveguide according to claim 7 wherein respective pairs of said closed-section portions extend from both ends of the slotted portion of the waveguide, the junctions of the respective pairs of portions being located on a line parallel to said line joining the ends of the slots.

9. A waveguide according to claim 7 wherein the slots occupy a region in the plane of the sheet or web having a dimension parallel to said straight line joining the ends of the slots that is substantially greater than the dimension of said region transversely thereto.

10. In apparatus for the measurement of the moisture content of a sheet or web of material and having a microwave circuit, the improvement consisting of a waveguide according to claim 1, a mounting for said waveguide, said mounting being adjustable to displace the waveguide in the plane of its curvature.

11. A waveguide for use in the measurement of the moisture content of a sheet or web of material and comprising, in combination, two mutually opposed channel-section waveguide portions each having spaced ends and respective edges of the channel-sections of the two portions being spaced apart and mutually aligned perpendicular to their extent so that said portions together define a waveguide length with opposed co-planar slots in opposite sides to receive the thickness of said material, respective closed-section portions forming continuations from the ends of the open-section portions to provide, at each end of said open-section waveguide length, a pair of waveguide portions of which the respective portions adjacent said open-section ends are divergent away from the plane of the slots, said pairs of portions also extending transversely away from said slotted waveguide length to ends transversely spaced therefrom, junction means at said transversely spaced ends providing common continuation paths for microwave energy through the respective waveguide portions of each said pair, whereby each channel section portion is supported in cantilever manner from said juntion means by respective ones of said pairs of waveguide portions to opposite ends of said channel-section portion and the web or sheet of material can be interposed between the channel-section portions to bring within the span of the slots a region of said sheet or web spaced from the edges thereof.

References Cited

UNITED STATES PATENTS

| | | |
|---|---|---|
| 2,982,855 | 5/1961 | Wickersham. |
| 3,079,551 | 2/1963 | Walker. |
| 3,240,995 | 3/1966 | Morris. |

FOREIGN PATENTS

| | | |
|---|---|---|
| 1,372,886 | 8/1964 | France. |

OTHER REFERENCES

Montgomery, ed., Technique of Microwave Measurements, [TMM], McGraw-Hill, New York (1947), p. 525.

RUDOLPH V. ROLINEC, Primary Examiner

P. F. WILLE, Assistant Examiner